Dec. 30, 1969  R. E. BUTTON  3,487,225
LINEARIZED RADIATION SENSITIVE TRANSDUCER APPARATUS
Filed Sept. 26, 1967  2 Sheets-Sheet 1
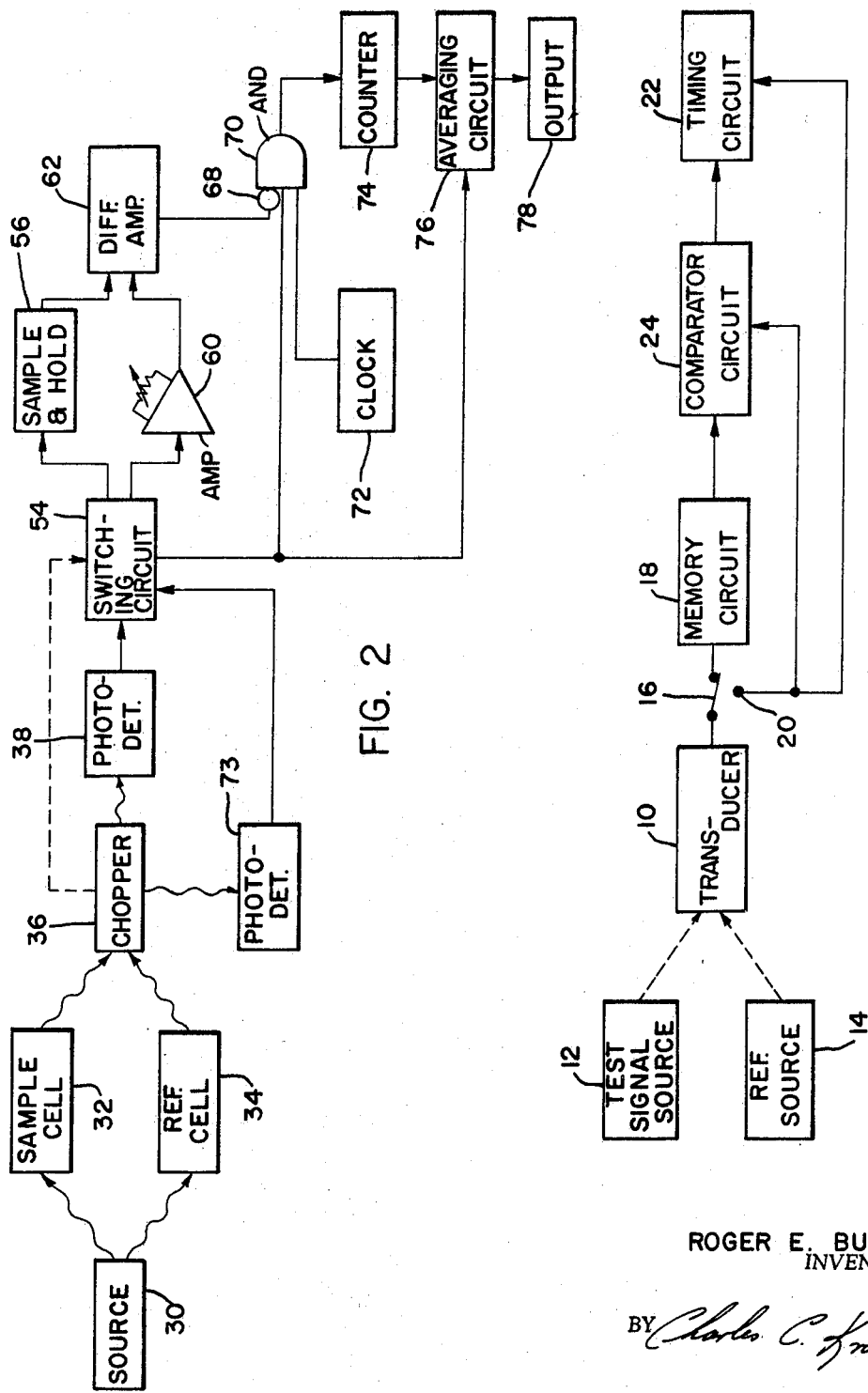
ROGER E. BUTTON
INVENTOR.
ATTORNEY Dec. 30, 1969   R. E. BUTTON   3,487,225
LINEARIZED RADIATION SENSITIVE TRANSDUCER APPARATUS
Filed Sept. 26, 1967   2 Sheets-Sheet 2
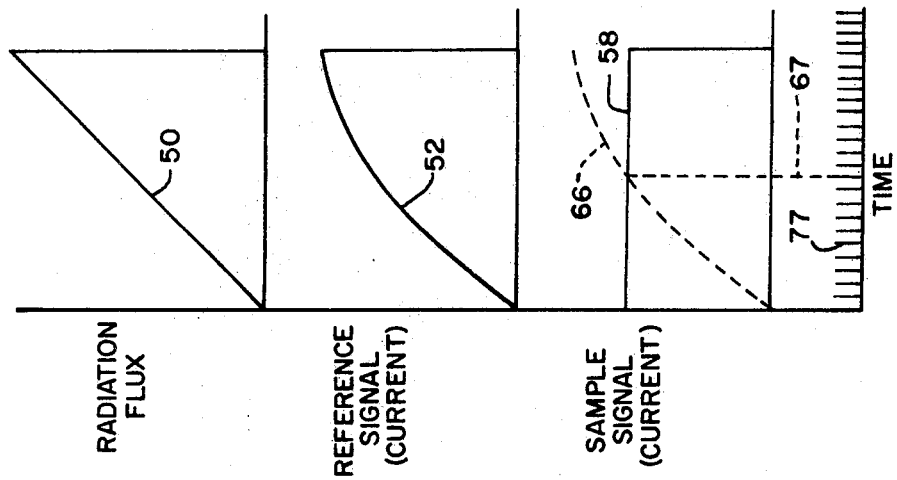
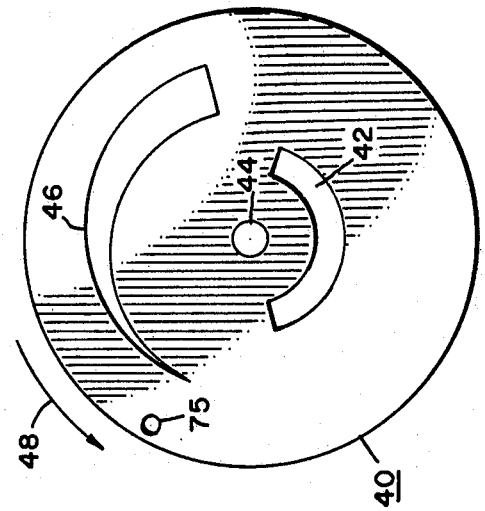
ROGER E. BUTTON
INVENTOR.

United States Patent Office 3,487,225
Patented Dec. 30, 1969

3,487,225
LINEARIZED RADIATION SENSITIVE TRANSDUCER APPARATUS
Roger E. Button, Brighton, N.Y., assignor to Bausch & Lomb Incorporated, Rochester, N.Y., a corporation of New York
Filed Sept. 26, 1967, Ser. No. 670,569
Int. Cl. H01j *39/12;* G01n *21/26*
U.S. Cl. 250—220          9 Claims

ABSTRACT OF THE DISCLOSURE

A system is disclosed for eliminating non-linearities and/or changes in operating conditions of a transducer. A test signal to be measured is applied to a transducer and a corresponding electrical signal is stored. A linearly changing reference signal, such as a ramp, is subsequently applied to the transducer. The stored signal and corresponding electrical reference signal are compared to develop a control signal when a predetermined amplitude ratio therebetween is reached. The time duration between the start of the reference signal and the occurrence of the control signal is measured to provide an accurate indication of the magnitude of the test signal.

BACKGROUND OF THE INVENTION

This invention relates to linearized transducer apparatus.

It is well known that it is difficult to achieve stable and linear type operation from transducer type devices, particularly if cost is a limiting factor. This is particularly true in the case of photoelectric type transducers that convert light or radiation energy into electrical signals. For example, relatively inexpensive photodiodes, and the like, exhibit a non-linear output transfer function. As a result it is difficult to achieve linear and accurate measurements with the photodiode for a wide range of signal inputs. Even if more expensive type transducers such as photomultiplier tube are employed, the operating characteristics thereof vary with changes in temperature and power supply voltages. Various circuits have been designed to overcome changes due to temperature and to maintain the power supply voltages constant. Such circuits may have increased the stability of the transducer but did not compensate for nonlinearity in its transfer function.

SUMMARY OF THE INVENTION

The apparatus of the invention corrects for the non-linearities and instabilities of transducers to provide stable and accurate measuring systems. A test signal and a reference signal are alternately applied to a transducer that converts signals to electrical signals having amplitudes related to the magnitude of the signals. The reference signal is a linearly changing signal, such as a ramp. Circuit means are coupled to the transducer for measuring the time duration for the amplitude of the electrical signal corresponding to the reference signal to reach a predetermined ratio with respect to the amplitude of the electrical signal corresponding to the test signal. The time duration provides a measure of the magnitude of the test signal. Any non-linearity in the operation of the transducer appears in the electrical reference signal which provides a non-linear time base to compensate for the non-linearity of amplitude of the electrical test signal. Furthermore, changes in operating conditions of the transducer also appears in both the test and reference signal and will be accordingly compensated.

BRIEF DESCRIPTION OF THE DRAWINGS

FIGURE 1 is a simplified block diagram of a measuring apparatus including the invention.

FIGURE 2 is an expanded block diagram of a photometric embodiment of the apparatus of FIGURE 1 including a photoelectric transducer.

FIGURE 3 is an embodiment of the chopper of FIGURE 2.

FIGURE 4 is a graphic representation of various signals in the apparatus of FIGURE 2 to aid in the explanation of the operation thereof.

DESCRIPTION OF THE PREFERRED EMBODIMENT

The transducer 10 of FIGURE 1 alternately receives test signals from the source 12 and a linearly changing signal from the reference source 14. The linearly changing signal can be a continuously increasing or decreasing signal, or a signal increasing or decreasing in small discrete steps. The transducer is responsive to a physical event or quantity (light, pressure, etc.). It generates a corresponding electrical signal in response to such stimuli. The transducer 10 can be for example, a photoelectric device for converting the light or radiant energy into electric signals as illustrated in FIGURE 2, or any other type of transducer such as a force or a pressure transducer. It is well-known that transducers of this sort have non-linear transfer functions, particularly the more inexpensive types. The apparatus of the invention allows the use of such non-linear transducers by automatically compensating for the non-linear transfer function to provide a substantially linear system.

The transducer 10 is coupled to a switching circuit illustrated as the switch 16. When the test signal is applied to the transducer 10, the switch 16 is in the position as illustrated applying the corresponding electric signal to a memory circuit 18. The memory circuit 18 stores a signal corresponding to the amplitude of the test electrical signal. When the reference signal is applied to the transducer 10 the switch makes connection with the contact 20 to apply a "start" signal to a timing circuit 22 and to apply the electrical signal corresponding to the reference signal to a comparator circuit 24. Comparator circuit 24 compares the amplitude of the test signal stored in the memory circuit 18 with the linearly changing reference electrical signal to apply a "stop" signal to the timing circuit 22 when the amplitude of the electrical reference signal reaches a predetermined ratio with resepct to the signal in the memory circuit 18. The time duration measured by the timing circuit 22 provides an accurate measure of the amplitude of the test signal applied to the transducer 10. This is accomplished by using a non-linear time base (the electrical reference signal) to compensate for the non-linearities in the transfer function of the transducer 10. The operation of such an apparatus is clearly explained with reference to the photoelectric system of FIGURE 2.

The photoelectric system of FIGURE 2 can, for example, be a spectrophotometer for measuring the light transmitting characteristics of materials. Radiation from a source 30, such as a monochromator, is directed through a sample cell 32 (adapted to receive the material to be tested) and a reference cell 34 (adapted to receive material to which the test sample is to be compared). The beams of radiation passing through the sample and reference cells 32 and 34 are directed through a chopper 36 to a photoelectric transducer 38, which may for example be a photodiode.

The chopper 36 can, for example, be a motor driven disk 40 as illustrated in FIGURE 3. The disk 40 includes two radiation transparent segments or openings therein. The first segment comprises a uniform curved opening 42 that is located closer to the center of the disk 44 than the second segment, a curved wedge shaped opening 46. The curved wedge shaped portion 46 expands linearly from a minimum opening at one end to a maximum opening at the opposite end. The optics of the apparatus of FIGURE 2 are arranged so that the test beam passes through the uniform opening 42 while the reference beam passes through wedge shaped opening 46. The disk 40 is rotated at a constant rate in the direction indicated by the arrow 48 so that the test and reference beams are alternately applied to the photodetector 38. With the wdege shaped opening 46, a linearly increasing reference beam of radiation (ramp) is applied to the photodetector 38 as illustrated by the curve 50 in FIGURE 4.

It can be assumed that the response of the photodetector 38 is non-linear to produce the electrical signal 52 as illustrated in FIGURE 4. It is to be understood that this is merely illustrative and the photodetector can have effectively any non-linear response.

The photodetector 38 is coupled to apply signals to a switching circuit 54 synchronized to operate with the chopper 36. When the test beam is applied through the opening 42, the switching circuit 54 applies the signal to a sample and hold circuit 56, that stores a signal corresponding to the amplitude of the electrical test signal (as illustrated by the curve 58 of FIGURE 4). When the reference beam passes through the wedge shaped opening 46, the switching circuit 54 applies the photodetector signal to a variable gain amplifier circuit 60.

The output signals from the sample and hold circuit 56 and the variable amplifier circuit 60 are applied to a high gain differential amplifier circuit 62. The differential amplifier 62 remains saturated in one condition of operation until the amplitudes of the signals from the sample and hold circuit 56 and the variable amplifier 60 reach a preset ratio. At this condition the operation of the differential amplifier 62 reverses and a "stop" signal is developed. The dashed curve 66 (FIGURE 4) illustrates the signal applied by the amplifier 60 corresponding to the amplified electrical reference signal (including the non-linearity of the photodetector 38). As illustrated, the curve 66 approaches and exceeds curve 58 as a non-linear function of time due to the non-linearity of the curve 66. The differential amplifier circuit 62 is set to apply the "stop" signal to an inverter circuit 68 when a predetermined ratio between the signals 58 and 66 is achieved. For example, the stop signal can be generated when the signals 58 and 66 have equal amplitude as designated by the dashed line 67 in FIGURE 4.

The inverter circuit 68 is connected to one input circuit of a three input AND gate circuit 70. The second input circuit is connected to a clock circuit 72 and the third input circuit is connected to the switching circuit 54. The clock circuit 72 generates electrical signals at a controlled periodic rate. The switching circuit 54 applies a control signal to enable the AND circuit 70 at a predetermined part of the reference signal, such as at the beginning. As long as the signals applied to the differential amplifier 62 are not at the preset ratio of amplitudes, the AND gate 70 is enabled by the switching circuit 54. A "start" pulse is generated by a second photodetector 73 by a light pulse through the hole 75 in the disc 40 (FIGURE 3) at the beginning of a reference pulse or other convenient point and applied to the switching circuit 54. The switching circuit 54, in response to the "start" pulse, allows signals from the clock 72 to pass a counter circuit 74. The counter circuit 74 counts pulses until the predetermined amplitude ratio is received by the differential amplifier 62 to develop the "stop" signal to disable the AND gate 70. In the example of FIGURE 4, the pulse 77 from the beginning of the ramp will be counted to the dashed line 67 (corresponding to the "stop" signal).

A control signal is also applied from the switching circuit 54 to an averaging circuit 76 at the start of each counting cycle. The averaging circuit 76 receives the number of pulses counted by the counter circuit 74 and averages them over a number of cycles of the chopper 36 to develop an output signal 78 corresponding to the average of the time durations measured. The average time duration in the output device 78 corresponds to the ratio of, or percent of, the amount of radiation transmitted through the sample cell 32 as compared to the amount transmitted through the reference cell 34.

The apparatus of FIGURE 2 can be calibrated by first inserting reference sample in both cells 32 and 34 and adjusting the gain of the amplifier 60 to provide a desired reading, such as 100, at the output display device 78. The test sample is now inserted into the sample cell and a reading corresponding to the ratio of transmittance of the sample with respect to the reference sample is developed at the output device 78. It should be noted that the transmittance of the test sample can be greater or less than the reference and a corresponding count recorded in the output device 78.

A reading in percent transmittance can be achieved by eliminating the reference sample. The gain of the amplifier 60 is adjusted for a reading of 100 (corresponding to 100%) with both cells 32 and 34 empty. The test sample is now inserted into the sample cell 32 and a count in the output device 78 is recorded corresponding to percent transmittance of the test sample.

What is claimed is:
1. Measuring apparatus comprising:
   radiation sensitive transducer means for generating an electrical signal having an amplitude corresponding to the magnitude of a signal to be measured and applied thereto;
   means for applying a radiation test signal to said transducer means;
   means for applying a linearly changing radiation reference signal to said transducer means, and
   circuit means coupled to said transducer means for measuring the time duration it takes the amplitude of the electrical signal corresponding to the reference signal to reach a predetermined ratio with respect of the amplitude of the electrical signal corresponding to the test signal.

2. Measuring apparatus comprising:
   transducer means for generating an electrical signal in response to a signal to be measured applied thereto;
   means for applying a test signal to said transducer means and for subsequently applying a linearly changing signal to said transducer means;
   a storage circuit;
   comparator circuit means for generating a control signal in response to signals applied thereto having a predetermined ratio of amplitudes;
   circuit means coupling said storage circuit to apply an electrical signal stored therein to said comparator circuit means;
   switching means alternately connecting said transducer means to said storage circuit for applying an electrical signal corresponding to the test signal, and to said comparator circuit means for applying an electrical signal corresponding to said linearly changing signal, and
   circuit means for measuring the time duration between a predetermined portion of said linearly changing signal and the occurrence of said control signal.

3. Measuring apparatus as defined in claim 2 wherein said circuit means for measuring the time duration comprises:
   a source of periodic electrical signals;
   a counter circuit;
   switching circuit means coupled to said source, said switching means, said comparator circuit and said counter circuit for applying said periodic electrical signals to said counter circuit for the time duration between said predetermined portion of the linearly changing signal and the occurrence of said control signal.

4. Measuring apparatus as defined in claim 3 wherein:
said comparator circuit means includes a differential circuit for generating said control signal when the amplitudes of the signals applied to the comparator circuit reach said predetermined ratio, and
wherein said switching circuit means includes a gate circuit having input circuits coupled to said comparator circuit means, said source and said switching means and an output circuit coupled to said counter circuit.

5. Photoelectric apparatus comprising:
radiation sensitive means for generating an electrical signal in accordance to the amount of radiation received;
means for alternately applying a test beam of radiation to be measured and a linearly changing beam of radiation to said radiation sensitive means;
a storage circuit;
comparator circuit means for generating a control signal in response to signals applied thereto having a predetermined ratio of amplitudes;
circuit means coupling said storage circuit to apply a signal stored therein to said comparator circuit means;
switching means alternatively connecting said transducer means to said storage circuit for applying the electrical signal corresponding to the test signal, and to said comparator circuit means for applying an electrical signal corresponding to said linearly changing signal, and
circuit means for measuring the time duration between a predetermined portion of said linearly changing signal and the occurrence of said control signal.

6. A photoelectric apparatus as defined in claim 5 wherein said circuit means for measuring the time duration comprises:
a source of periodic electrical signals;
a counter circuit;
switching circuit means coupled to said source said switching means, said comparator circuit and said counter circuit for applying said periodic electrical signal to said counter circuit at the start of the linearly increasing signal until the occurrence of said control signal.

7. A photoelectric apparatus as defined in claim 6 wherein:
said comparator circuit means includes a differential circuit for generating said control signal when the amplitude of the signals applied to the comparator circuit reach said predetermined ratio, and
wherein said switching circuit means includes a gate circuit having input circuits coupled to said comparator circuit means, said source and said switching means and an output circuit coupled to said counter circuit.

8. A photoelectric apparatus as defined in claim 6 wherein
said linearly changing radiation beam changes in an increasing direction;
said test beam is substantially constant;
said switching means is coupled for synchronous operation with said means for applying said test beam and said linearly changing beam so that said storage circuit stores a signal having a magnitude corresponding to the electrical signal generated by the radiation sensitive means in response to said test signal and an increasing electrical signal is applied to said comparator circuit means for comparison with said signal in said storage circuit corresponding to the response of said radiation sensitive means to said linearly increasing radiation beam.

9. Photoelectric apparatus comprising:
a photodetector circuit for generating an electrical signal corresponding to the amount of radiation received;
a sample cell and a reference cell;
means for directing separate beams of radiation through said sample cell and said reference cell to said photodetector;
means for interrupting said beams so that alternate beams from said sample cell and said reference cell are applied to said photodetector, wherein said beam from said reference cell linearly increases from zero to a maximum value, wherein said beam from said sample cell is substantially constant;
a memory circuit;
a variable gain circuit;
a comparator circuit coupled to said memory circuit and said variable gain circuit for generating a control signal when the amplitude of the input signals to said comparator circuit reach a predetermined ratio;
first switching means coupling said photodetector to said memory circuit and said variable gain circuit for applying an electrical signal corresponding to said sample beam to said memory circuit and an electrical signal corresponding to said reference beam to said variable gain circuit;
counter means;
a source of periodic signals, and
second switching means coupled to said first switching means and said comparator circuit for applying said periodic pulses to said counter means for a time duration between a predetermined part of said reference beam and the occurrence of said control signal.

References Cited

UNITED STATES PATENTS

| 3,025,746 | 3/1962 | Cary et al. | 250—233 X |
| 3,071,037 | 1/1963 | Brumley | 250—220 X |
| 3,210,548 | 10/1965 | Morrison | 250—211 |
| 3,317,733 | 5/1967 | Horton et al. | 250—211 |

WALTER STOLWEIN, Primary Examiner

U.S. Cl. X.R.

250—218, 233; 356—205